United States Patent
Poisson et al.

(10) Patent No.: US 7,631,227 B2
(45) Date of Patent: Dec. 8, 2009

(54) AUTOMATED TESTING AND CONTROL OF NETWORKED DEVICES

(75) Inventors: Kenneth J. Poisson, Ottawa (CA); Jean-Sebastien Trottier, Kanata (CA); Jonathan Beverley, Ottawa (CA); Vladimir Vobruba, Ottawa (CA); Pankaj Gupta, Kanata (CA); Nola Michele Aunger, Almonte (CA); Normand St-Laurent, Ottawa (CA); Paul Hill, Ottawa (CA); Mark Binns, Toronto (CA); Clifford Uchimaru, Ottawa (CA); Kimberley J. Muma, Ottawa (CA); Randall A. Phillips, Ottawa (CA); Rick Casey, Ottawa (CA); Chris Ivan, Ottawa (CA)

(73) Assignee: Etaliq Inc., Ottawa, ON (CA)

( * ) Notice: Subject to any disclaimer, the term of this patent is extended or adjusted under 35 U.S.C. 154(b) by 427 days.

(21) Appl. No.: 11/562,307

(22) Filed: Nov. 21, 2006

(65) Prior Publication Data

US 2008/0120521 A1 May 22, 2008

(51) Int. Cl.
*G06F 11/00* (2006.01)
(52) U.S. Cl. .................... 714/43; 714/4
(58) Field of Classification Search ............ 714/4, 714/43
See application file for complete search history.

(56) References Cited

U.S. PATENT DOCUMENTS

| | | | |
|---|---|---|---|
| 5,659,547 A * | 8/1997 | Scarr et al. .................. 714/4 |
| 5,754,755 A | 5/1998 | Smith, Jr. | |
| 5,809,286 A * | 9/1998 | McLain et al. ............ 703/23 |
| 5,913,023 A | 6/1999 | Szermer | |
| 5,953,519 A * | 9/1999 | Fura .......................... 716/18 |
| 6,014,760 A | 1/2000 | Silva et al. | |
| 6,158,031 A | 12/2000 | Mack et al. | |
| 6,249,882 B1 | 6/2001 | Testardi | |
| 6,353,896 B1 | 3/2002 | Holzmann et al. | |
| 6,385,609 B1 | 5/2002 | Barshefsky et al. | |
| 6,856,950 B1 | 2/2005 | Abts et al. | |
| 6,907,546 B1 | 6/2005 | Haswell et al. | |
| 7,010,782 B2 * | 3/2006 | Narayan et al. ............ 717/124 |
| 7,031,981 B1 | 4/2006 | DeLuca et al. | |

(Continued)

FOREIGN PATENT DOCUMENTS

WO    WO 2007/103849    9/2007

*Primary Examiner*—Marc Duncan
(74) *Attorney, Agent, or Firm*—Garvey, Smith, Nehrbass & North, L.L.C.; Brett A. North

(57) ABSTRACT

A system, method of automated testing and control of networked devices is provided. One or more test cases are defined in a test plan for execution against a plurality of networked devices. The test cases are created using a command defined grammar comprising verbs which characterize how commands or actions should be performed. Abstraction markers allow for device-specific characteristics to be mapped to a target device, without modification of the test cases and the test plan itself. The verbs and abstraction markers, once mapped to a target device form device-specific commands comprising actions and device-specific characteristics which are executed against the target networked device. The resulting responses are parsed against expected responses and a result or verdict is assigned. By providing command grammar and abstraction capability a common test plan and test cases can be applied across a range of diverse networked devices without require user intervention or modification.

28 Claims, 12 Drawing Sheets

U.S. PATENT DOCUMENTS

| | | | |
|---|---|---|---|
| 7,055,138 B2 * | 5/2006 | Sutton | 717/125 |
| 7,117,411 B2 | 10/2006 | McNeely et al. | |
| 7,272,822 B1 | 9/2007 | Riggins et al. | |
| 7,496,815 B2 * | 2/2009 | Bhaumik et al. | 714/724 |
| 7,533,294 B2 * | 5/2009 | Mishra et al. | 714/10 |
| 7,581,212 B2 * | 8/2009 | West et al. | 717/136 |
| 2002/0162059 A1 * | 10/2002 | McNeely et al. | 714/703 |
| 2003/0191590 A1 | 10/2003 | Narayan et al. | |
| 2003/0196190 A1 | 10/2003 | Ruffolo et al. | |
| 2004/0015867 A1 | 1/2004 | Macko et al. | |
| 2004/0205406 A1 * | 10/2004 | Kaliappan et al. | 714/31 |
| 2004/0254919 A1 | 12/2004 | Giuseppini | |
| 2004/0260982 A1 * | 12/2004 | Bhowmik et al. | 714/43 |
| 2005/0114508 A1 | 5/2005 | DeStefano | |
| 2006/0070035 A1 | 3/2006 | Ulrich et al. | |
| 2006/0090100 A1 | 4/2006 | Holzapfel et al. | |
| 2007/0022407 A1 | 1/2007 | Givoni et al. | |
| 2007/0245198 A1 * | 10/2007 | Betawar et al. | 714/742 |

* cited by examiner

AUTOMATED TESTING AND CONTROL OF NETWORKED DEVICES

TECHNICAL FIELD

The present invention relates to automated testing and control of networked devices, in particular to the creation and execution of test plans for performing automated testing across a range of networked devices.

BACKGROUND

Hardware and software testing of networked devices is an integral part of the development and deployment processes. Testing is required to ensure consistent and predictable operation of the networked device under various operational conditions and to ensure the device will integrate successfully within networks. This is particularly important in networks having a wide range of networking devices produced by a variety of vendors such as telecommunications equipment. Test automation environments or testbeds are developed to automate the testing and validation process to rigorously exercise device functionality and ensure compliance with design specifications.

In the testing of Internet Protocol(IP)-addressable networked devices such as telecommunications networking equipment a Subject Matter Expert (SME) creates a test plan detailing how the networked device or hardware should be tested in order to ensure the hardware provides the desired design functionality. The test plan is converted by a programmer to code such as a test script which ideally implements the test objectives defined by the SME. The test script comprises commands for executing queries and configuration changes against the target hardware to achieve the desired objectives. The test plan will also detail the network configuration required to simulate real network conditions.

In order to speed up the development process, individual telecom equipment manufacturers have developed automated test environments dedicated to testing specific types or brands of hardware to implement the test plans. The automated test environments which may be implemented on a general purpose computer or by dedicated test hardware may be either directly connected to the target hardware or connected by a communications network to the target hardware. The automated test system may also provide simulated traffic or control third party traffic generators to simulate desired network conditions. Most equipment providers design, implement, support and maintain their own test automation environments using widely available programming languages such as TCL (Tool Command Language), PERL (Practical Extraction and Report Language) and Expect. The test scripts created in these test automation environments use text based commands for interaction with the devices under test through a command line interface system. The command line interface may be implemented over a network terminal protocol such as Telnet, SSH (Secure shell) or other direct connection communication such as serial based communication protocols. Alternative protocols may also be used such as simple network management protocol (SNMP), TL1, XML, and others for querying and controlling devices.

In more complex testing environments involving multiple brands of hardware, and possibly different software loads, the complexity of the automated testing environment grows significantly. Understanding and developing unique test scripts for individual vendor equipment can be laborious and time consuming and provide inaccurate results if the test scripts are not adapted properly. Managing a testing environment can become even more complicated when trying to integrate multiple test platforms required to test a series of devices on a network. In order to effectively test networked devices or nodes the programmer has to ensure that the test script achieves the desired testing objectives defined by the SME. This can be particularly difficult if the programmer is limited in understanding the operation of the hardware and software involved in the testing process. Another complicating factor in test automation is the accelerated development of new technologies having new and unique hardware features and configurations which will either require a unique testing system or only provide limited ability to be tested using current automated testing environments.

Accordingly, systems and methods that enable flexible automated testing of diverse networked devices remains highly desirable.

SUMMARY

Automated testing and control of networked devices is provided. A test case is defined in a test plan for execution against a plurality of networked devices. Each test plan may contain multiple test cases structured using a group hierarchy. Each test case is created using command grammar comprising verbs which define actions for execution against the networked devices under test. An execution plan can also be defined for executing multiple test plans to increase flexibility of the system. Abstraction markers in each test plan allow for device characteristics to be mapped to the particular device under test. The device-specific commands comprising the actions and device characteristics are executed against the device. The characteristics can include command mappings, node behaviors, device specifications and grammar mappings. The resulting responses are parsed against expected responses defined in the test case and device-specific characteristics retrieved from a node database and a verdict is assigned. The test plans can be executed against the plurality of devices without modification to individual test plan for the particular implementation requirements of the networked device. The assigned verdicts are identified against each of the test cases and test plan.

Thus, in an aspect there is provided an automation test system, for testing and control of a plurality of networked devices, the system comprising a node database comprising device-specific characteristics associated with each of the plurality of networked devices; an abstraction module for converting verbs identified in a plurality of test cases to a set of actions, selected based on device-specific characteristics mapped from the node database, to be executed in relation to target networked devices, the abstraction module also for mapping abstraction markers used in the test cases to device-specific characteristics, wherein the verbs and abstraction markers form device-specific commands; an execution module for executing the device-specific commands generated by the abstraction module, against the target networked devices, by sending device-specific commands to the target networked devices; and a parser module for parsing responses received from the target networked devices during execution of the test cases by the execution module, and for determining a verdict for each test step and for each test case.

In a further aspect, there is provided a method of testing and control of a plurality of networked devices, the method comprising the steps of converting verbs identified in test cases to a set of actions to be executed in relation to the plurality of networked devices; mapping abstraction markers in test cases to device-specific characteristics of the plurality of networked devices; sending device-specific commands comprising the converted actions and mapped characteristics to the plurality of networked devices; receiving responses from the plurality of networked devices; parsing the received response for each of the plurality of networked devices to determine a result for each test step and for each test case; and storing the result.

In yet a further aspect, there is provided a computer readable medium, containing one or more instructions executable by a computer for performing a method of test and control of a plurality of networked devices, the method comprising the steps of converting verbs identified in test cases to a set of actions to be executed in relation to the plurality of networked devices; mapping abstraction markers in test cases to device-specific characteristics of the plurality of networked devices; sending device-specific commands comprising the converted actions and mapped characteristics to the plurality of networked devices; receiving responses from the plurality of networked devices; parsing the received response for each of the plurality of networked devices to determine a result for each test step and for each test case; and storing the result.

Other aspects and features will become apparent to those ordinarily skilled in the art upon review of the following description in conjunction with the accompanying figures.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Figure 1:
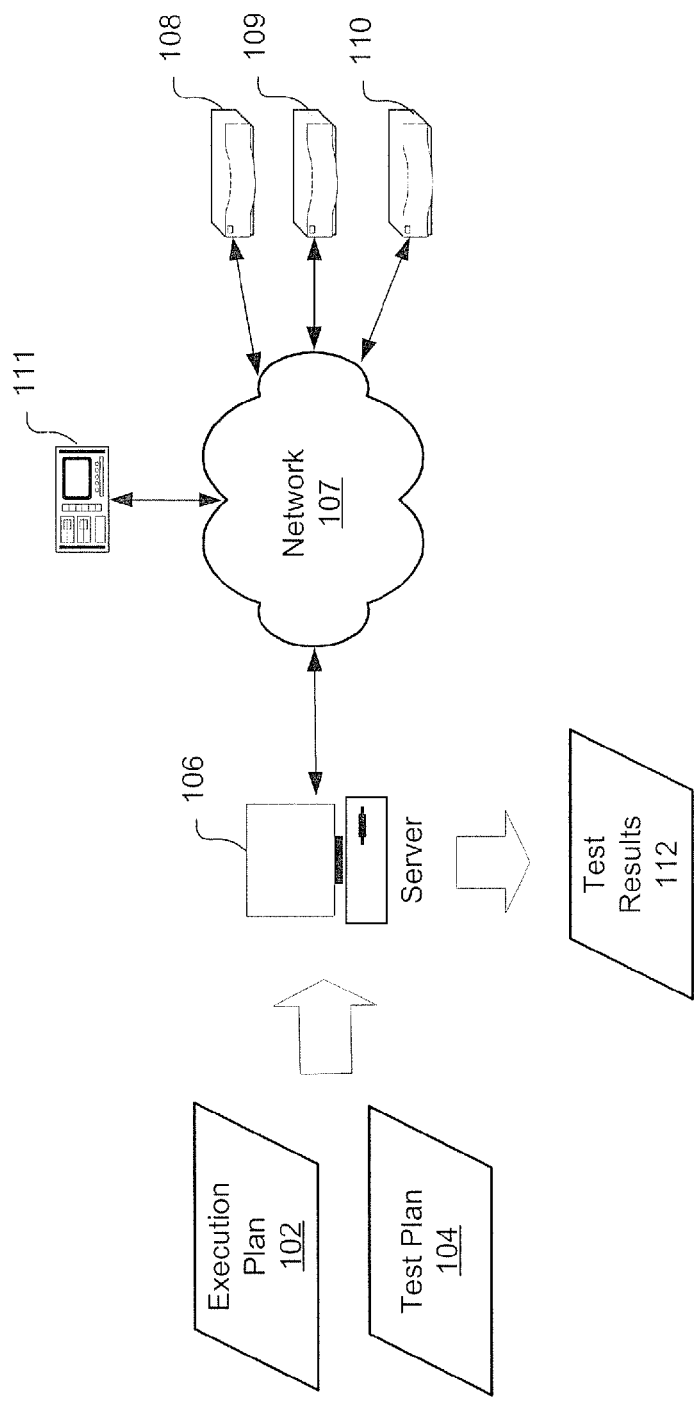
FIG. 1 is a schematic representation of an automated test environment.

Embodiments of the present invention are described below, by way of example only, with reference to FIGS. 1-11. A system, method and computer readable medium for automating testing and control of networked devices is provided. Automation testing occurs in a development environment to verify functionality or on live operational networks in order to do a root cause analysis during the process of problem determination and isolation of impaired networking equipment. The devices may encompass a range of networking hardware such as routers, hubs, switches or any type of configurable equipment utilized in a network.

In order to improve and simplify the process of automation testing, an automation test system is provided which enables common test plans to be created which can be executed across a diverse range of hardware and software devices in a networked environment. The test plans are constructed using a template structure of tags that delineate the test plan and its attributes from those associated with individual test groups and test cases. The groups and cases are arranged in a hierarchy in the same manner that test plans are written today. Delineation and attribute tags are also used within each individual test group or test case to enable the user to assign individual tracking attributes and to document each in a highly organized manner. The test system provides a command grammar, consisting of verbs and nouns used within the test plan to define the steps to be followed when configuring the devices, displaying their statuses and verifying device responses against expected results.

In addition to the test plan hierarchical implementation, tags and the command grammar, the system provides an abstraction capability in order to enable an individual test plan to operate over a vast array of networking equipment provided by one or more network equipment manufacturers. Two types of abstraction markers are implemented within the automation test system. Hardware abstraction markers are used to operate test plans over various testbeds, devices and their components, while command line interface (CLI) abstraction markers are used to enable test plans to operate over different vendors CLI command and response definitions. The test plan structure and the abstraction marker system allows the objectives of the test plan to be decoupled from the vendor specific command implementation for any piece of equipment or device. This enables a common test plan to be executed across many vendors, hardware and software versions without recreating or redesigning the test plan. The underlying vendor specific commands can be transparent to the SME increasing flexibility in automation testing, reducing development time and optimizing testing time.

An execution plan is defined to increase the flexibility of the test plan by separating the resources to be used during execution from the test plan itself. This separation enables a single test plan to be executed against any number of testbeds. The combination of the execution plan and test plan enables the automation test system to selectively execute test cases across a varied hardware platform. The automation test system also provides both detailed and summarized reporting of all of the cases and groups in the test plan. Detailed reports and logs are indexed to each other and to the original test plan objectives, greatly simplifying analysis.

FIG. 1 is a schematic representation of an automated test environment. The server 106, receives or contains an execution plan 102 and a test plan 104 and represents the core of the automation test system. The execution plan 102 defines the resources, control flags and the lists of tests to run, required to execute one or more test plans against the testing resources available. In addition, other details such as the node class, addresses and login (user id/password) as well as various other user definable attributes for each device to be tested are identified in the execution plan 102. The test plan 104 provides the instructions for performing tasks on target devices to achieve testing objectives. It should be noted that the execution plan 102 may be further divided into additional plans such as a resource plan and a schedule plan if desired. The resource plan would define the devices to be used and the schedule plan would define the control flags, tests to run and the actual schedule of when to execute. Further aspects of the execution plan 102 and test plan 104 are described in connection with FIGS. 3a and 3b respectively.

The server 106 processes the execution plan 102 and the test plan 104. The devices under test 108, 109, and 110, may be any communications capable device including but not limited to switches, routers, bridges, etc., which are connected to the server 106 by network 107. The network may utilize one or more protocols such as IP or ATM. Alternatively the networked devices 108, 109, and 110 may be networked directly to the server 106 by serial based communication protocols. Each device may be from a different manufacturer, or a different product version, hardware version and/or software version from the same manufacturer. Although a single server 106 is described in connection with the test automation system, it should be understood that the functions or modules of the system may be distributed over one or more processing units.

The execution plan 102 and the test plan 104 can also detail the configuration of each device, 108, 109 and 110, required for proper execution of the test cases within the plan as well as additional equipment such as a traffic generator 111 or the like, connected to the network 107, which is often utilized for simulating networking conditions. The test plan 104 can be executed against the desired device by mapping user-defined commands, identified as CLI abstraction markers, to the commands and formatting applicable to each target networked device. Using the hardware and CLI abstraction marker system, each networked device 108, 109 and 110 can comprise unique hardware, software, programming interfaces and operating parameters, but may be verified by common test cases in a common test plan 104. Device-specific commands are sent from the server 106 to the test device with the responses to the commands being logged by the server 106. By processing the responses to the commands, against a set of user-defined expected results and the node class definitions of successful and unsuccessful command responses, a result or verdict can be assigned to the individual test cases and test plans. The verdict may provide some kind of indication such as a pass or fail. The test results 112 may be stored in various formats accessible to the server 106 or an off-line processing system.

Figure 2:
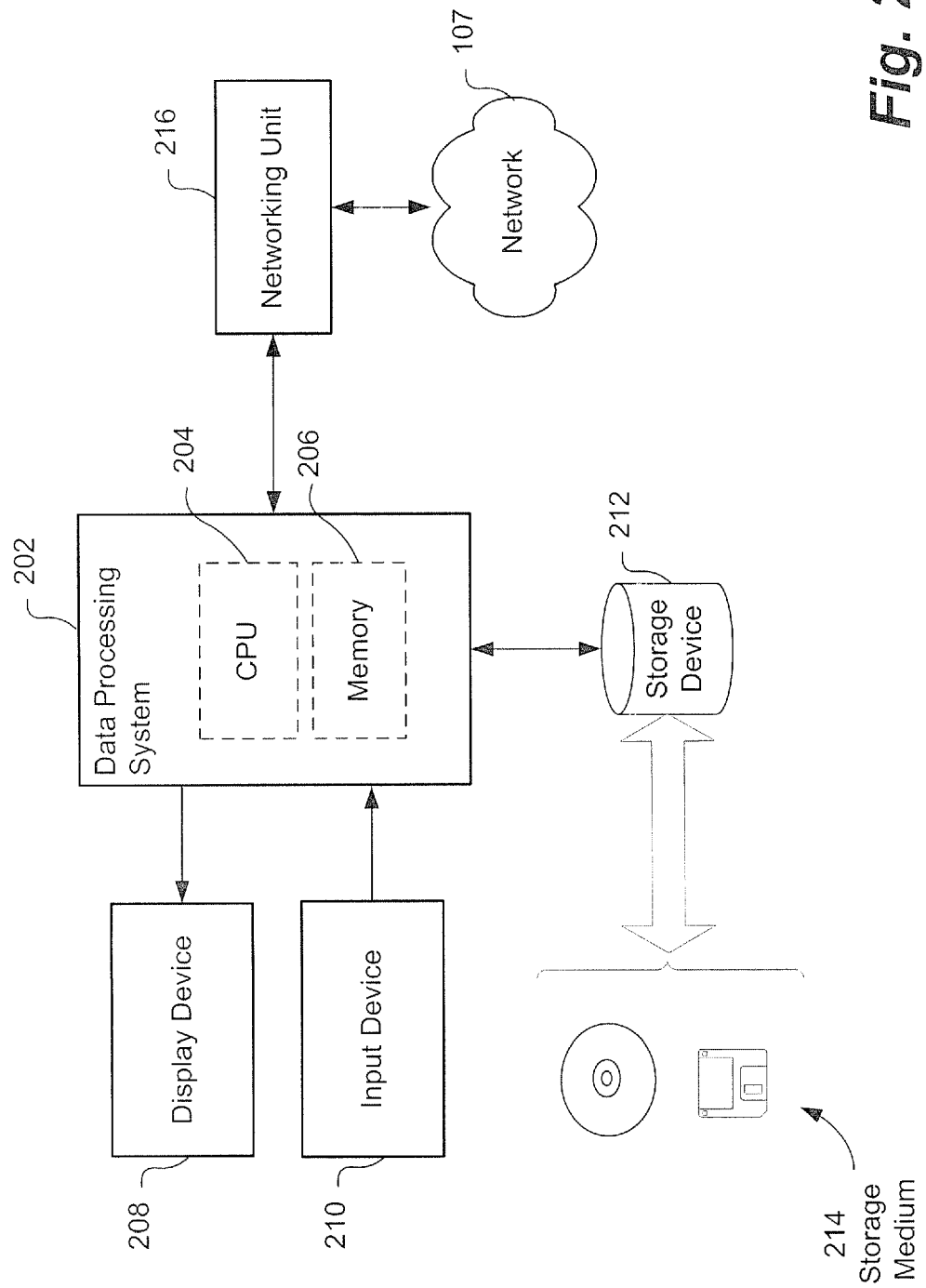
FIG. 2 is a block diagram representing a general purpose computer system in which aspects of the present invention and/or portions may be incorporated.

FIG. 2 shows a computer system for implementing a server 106. The server 106 comprises a main body 202, including a CPU 204, a memory 206 and their peripheral circuits. A display device 208, such as an LCD or CRT display is utilized as well as an input device 210, such as a keyboard or a mouse for programming of the test system. A networking unit 216 for exchanging data with other devices across the network 107 is provided. A storage device 212, such as a hard drive, or storage mediums 215 such as a Digital Versatile Disc (DVD) drive, a floppy disk drive, or a Compact Disk (CD) drive is utilized to store the operating instructions of the automation test systems as well as the execution plan, test plan and test logs and analysis results. The networking unit 216 may alternatively provide a direct connection to devices by serial communications protocols.

Figure 3A:
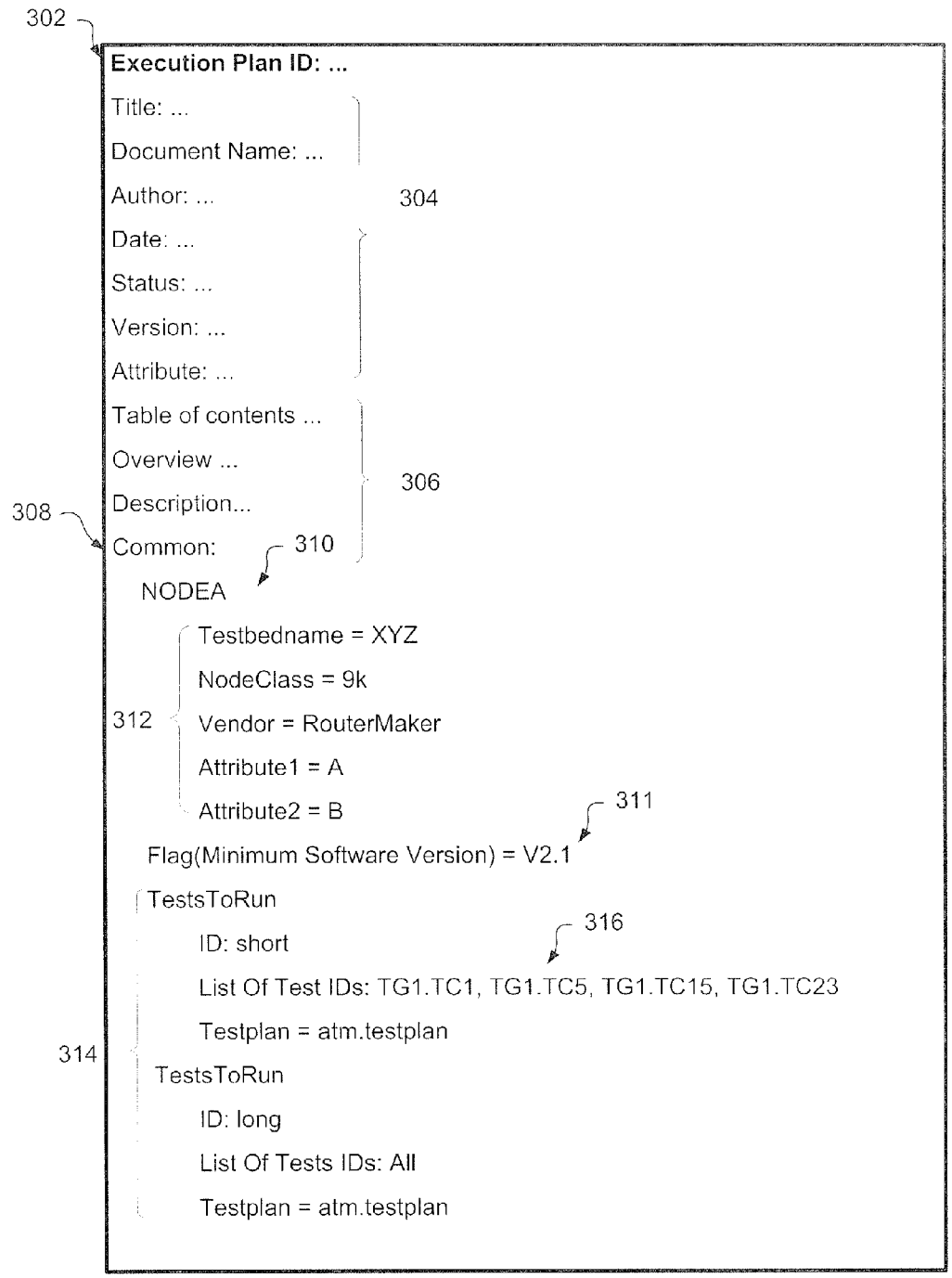
FIGS. 3A & 3B are schematic representations of an execution plan and a test plan respectively.
Figure 3B:
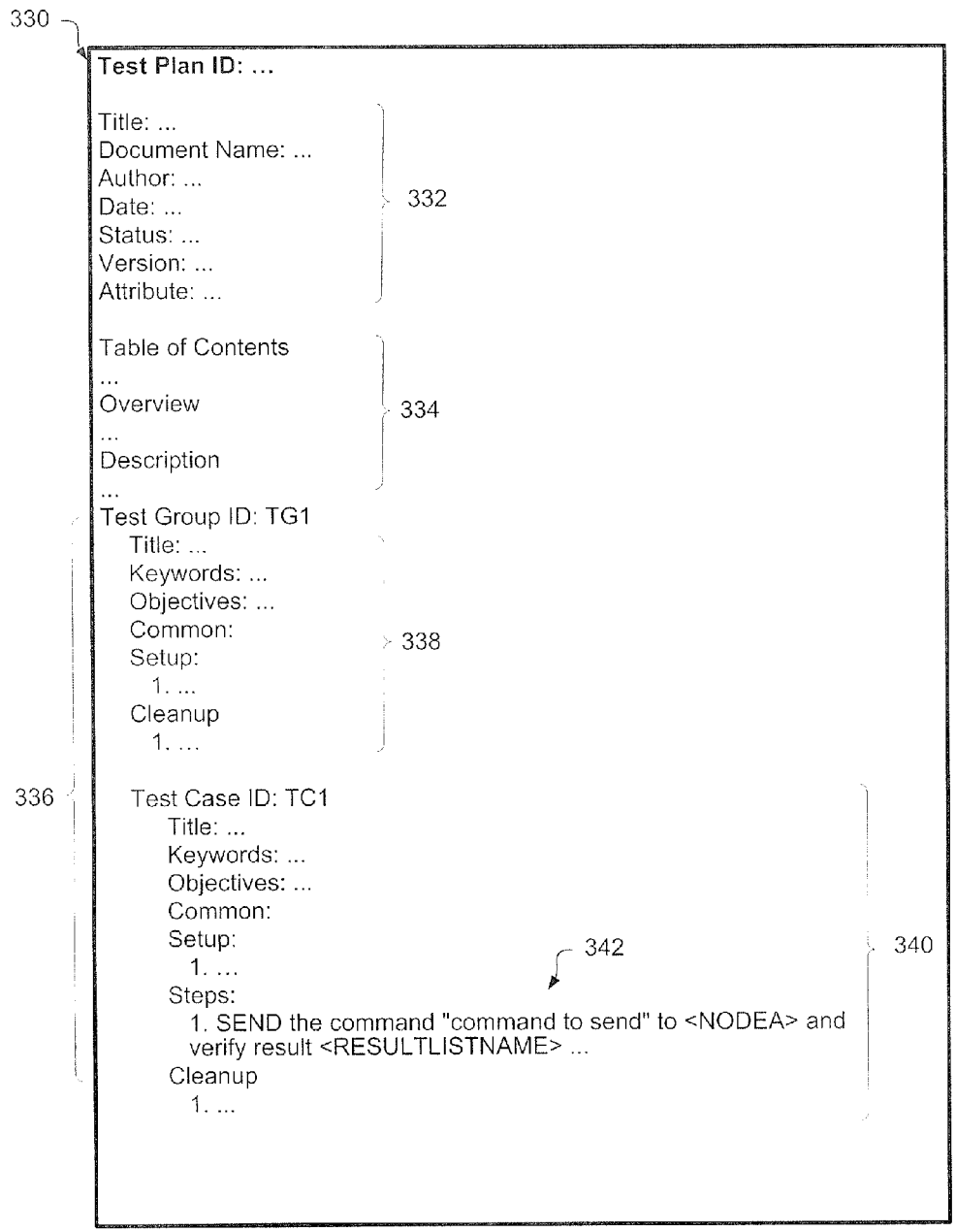

FIGS. 3a and 3b. show embodiments of an execution plan 102 and a test plan 104 respectively and some of the features that they provide. The execution plans and test plans used by the automation test system are structured using tags in a flat file to delineate the test plan contents into test groups, test cases and the various sections of each. The execution plan 102 and test plan 104 are created using templates that specifically identify the structure of the plan and its related info as well as the resources, test groups and test cases. A set of tags within the templates identify plan-related tracking attributes such as title, id, author, date, topic, description, etc. A similar set of tags within the template identify the group and case-related tracking attributes. Optionally, additional user-defined tracking attributes can also be defined for each of the plans and each of the individual test groups and cases. Sections for description and objective definition, comments and notes, parameters or commands for device configuration, as well as setup, steps and cleanup section areas are provided. The structured format also provides a more user friendly format by including detailed common language notes by an SME describing the objectives of a test, expected results, and details of configuration. The automation system provides the ability to integrate the traditional common language test plan with an automation capability through the use of the test and execution plans with their various tags and definitions, in combination with the structured command grammar.

Referring to FIG. 3a, the execution plan 102 is identified by a unique execution plan id 302. Information such as title, document name, author, status, version, attributes etc. are defined in block 304. Block 306 provides information such as a table of contents, overview of the execution plan and a description of the available and/or required resources. These attributes can optionally be stored in a results database and used during analysis and reporting for purposes such as filtering and categorization. Common attributes are then defined beginning at 308. The execution plan 102 defines control flag's that are effectively variables that are used within the test plan to alter execution of groups and cases. A specific logical node such as NODEA 310 refers to a physical device which contains a specific physical address within the node database 410. Various node specific attributes can be attached to this physical node definition including IP Address, Communication Protocol, Node Class, etc. The testbed to which the node belongs is defined using the testbed attribute. One or more user created control attributes about the node are also defined here. For example: the user may define one or more ports or cards to be used on this node by defining attributes PORT1=Ethernet 1/0, PORT2=SONET 3/0, CONTROLCARD=Slot3.

Specific flag or global control attributes can be defined such as at 311. A flag is defined in the execution plan and is used within the test plan to determine how to execute the group or case, or whether to execute it at all based upon a defined condition. For example, the Flag(Minimum Software Version)=V2.1 could be verified by one or more test groups or cases to determine whether or not to execute a test. One particular test may require that the minimum software version flag be V3.0 or greater, or it will not be executed. If these attribute conditions are not met the test cases will not be executed. Another example could specify that a fully scaled test or group of tests be executed using the value of a Flag (number of scaled connections) within the execution plan 102. The test would create and verify only the number of connections defined in the execution plan flag variable. Altering this flag to the number of connections supported on different vendor hardware exhibits the flexibility of the automation system provided.

The definitions of the set of tests to be executed are then identified in block 314, each of which has a unique ID. Specific list of tests that are to be executed can be requested when selecting a test plan/execution plan by referencing the ID of the tests to run definitions section in the execution plan. The tests to run definitions use the fully qualified ID's of the groups and/or cases that are to be executed. For example, as shown at 316, a fully qualified test case ID, TG1.TC5, is identified by combining the test group ID (TG1) and the test case ID (TC5), while the fully qualified test group ID is simply TG1. Test plans can also be referenced in the execution plan by identifying the test plan ID in a test to run definition. Optionally the combination of test plan and execution plan and the appropriate tests to run can be selected at scheduling time within a graphical user interface (GUI) scheduling module or from the command line.

Figure 6:
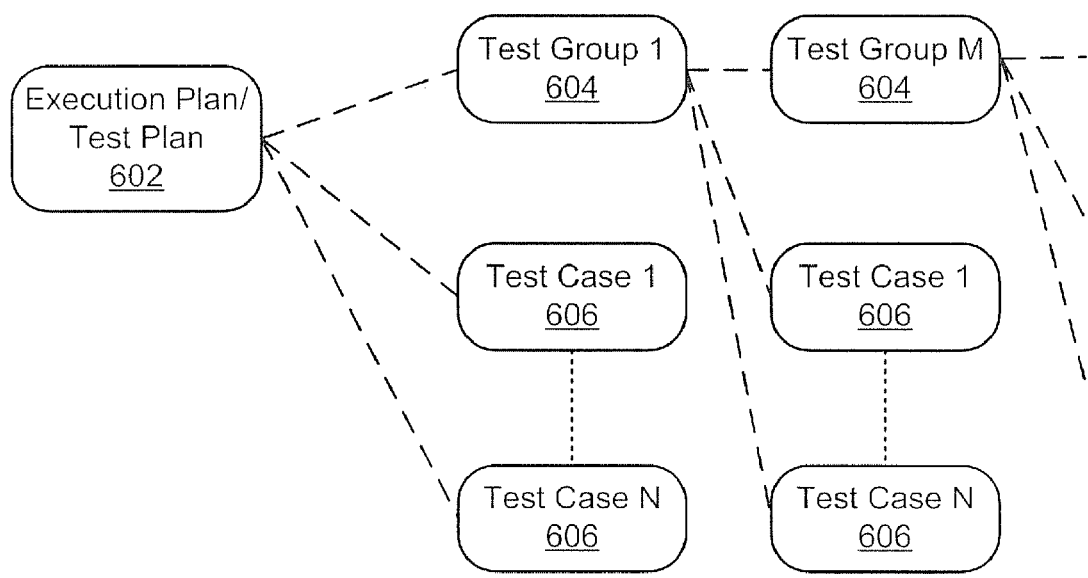
FIG. 6 is an illustrative example an execution plan and test plan group and case structure.

Referring to FIG. 3b, the test plan id 330 uniquely identifies the particular test plan. Test plan related attributes are defined in block 332 similar to the execution plan 102. Optional user-defined tracking attributes can be added here. Block 334 provides information as would be contained in any test plan document such as a table of contents, an overview and a description of the test plan, which may optionally include diagrams related to the physical setup(s) required for this set of tests. Test groups and cases also have attribute definitions and section tags that identify areas of each group or case (title, keywords, objectives, common, setup, steps, cleanup, notes, etc.) Each test plan 102 can have one or more groups and each group can have more groups and/or cases in a hierarchy. FIG. 6 contains additional discussion related to the test plan hierarchy.

Block 336 comprises multiple test groups 338 which in turn will have multiple test cases 340. Additional unique tags can be included for each test group or case such as a title, keywords and objectives, etc.

In the test group 338, sections define common definitions, setup steps and cleanup steps, and in the test case 340, sections define common definitions, setup steps, test steps and cleanup steps. These definitions and steps utilize the command grammar to define operations to be executed against target devices. The command grammar uses nouns and verbs to represent specific operations to be performed that may be predefined or defined by the user. The grammar used in defining the execution plan 102 and test plan 104 reduces the amount of programming required by the SME to automate test plan execution creating a combined universal test plan structure. Execution of an automated test suite can be easily implemented with no modification to the test plans by utilizing the execution plan and its references to the node database to implement the full hardware and CLI abstraction.

Commands to be sent to the particular node can optionally be abstracted using a user-defined abstraction marker. The abstraction marker is mapped to a vendor device-specific command within the node database 410, discussed in connection with FIG. 5. The abstraction marker can be any type of embedded code or ASCII symbols such as for example: 'show routing table' which is mapped during execution to the appropriate vendor specific command to display the content of the routing table. The combination of the command grammar and the abstraction markers allow the test plan 104 to be written in such a manner as to remove the need for unique test plan implementations for each target device. Each device is mapped to a logical node in the execution plan 102 which is re-mapped to a node class definition within the node database 410. The abstraction markers can be defined within the node database 410 such that the vendor specific command is used when executing a test against a specific device. The vendor node class also includes specific definitions utilized to apply parameters to the device during execution of commands. For example: card and port related parameters such as speed of operation, port types supported, number of supported connections, supported protocols, etc. can be referenced to increase the flexibility of the test plan.

Hardware abstraction markers allow hardware abstractions, such as at a card and port level, to be performed. For example, a test plan can be written to verify the operation of a routing protocol over a series of optical interfaces in specific slot positions on several different network routers and switches, and then through abstraction the same test plan can be made to operate over a different series of networked devices on Ethernet interfaces that are installed on different slot positions. Therefore, hardware identified in the test plan can be mapped to different hardware without having to modify the test plan.

Another example of the use of hardware abstraction is when a test plan is written to verify the QOS shaping capabilities of a specific hardware card installed in a testbed. For example, the test plan is written to test the QOS shaping capabilities of a specific router card or interface which supports 1024 shaping rates and, through hardware abstraction, the same test plan can verify, on a different hardware setup, another hardware card that supports 16384 shaping rates. The node database 410 contains a reference to each of the hardware card types used above and during execution the appropriate functionality is tested with the supported shaping rates of the card found within the testbed. Both of the above hardware abstraction examples are most often used to abstract test plans over single vendor equipment of disparate functionality, although they can also be implemented for multi-vendor.

CLI abstraction markers enable the ability to define a test plan that operates over multiple vendors' equipment or versions. For example, a configuration command to apply an IP address to one vendor's equipment can be substituted to another vendor's command to accomplish the same task through a CLI abstraction methodology. A node class is defined in the node database 410 for each unique vendor's equipment specifying the operational characteristics of that vendors equipment and user interface as well as the replacement marker equivalences for inter-node class testing. This CLI abstraction marker system can be used for vendor commands (configure and display) as well as for responses. For example, a response from one vendor to a traffic statistic request may be "RX packets" while a second vendor response may be "packets received". The test plan 104 can be written to verify either vendor response through a method of node class based CLI abstraction markers.

In addition to enabling hardware and CLI abstraction, the node class definition also defines the operational characteristics of each vendor's equipment. Operational characteristics of each node class are further defined in the node database 410 as described in connection with FIG. 5.

In combination with abstraction a grammar is utilized that is composed of common language words, each of which has a specific purpose in automated testing. This grammar is composed of nouns (for example VARIABLE, LIST, RESULTLIST, etc.) and verbs (for example SEND, CONFIG, WAIT, CHECK, etc.). The structured commands read more like a natural language sentence enhancing readability and consistency while significantly reducing the time to create an automated test plan. Some examples of command grammar:

SEND: to send a command to a test device and retain the response for additional use or use the response for comparison against an expected RESULTLIST.

CONFIG: to send a series of configuration commands to a device.

LIST: to define of list of elements for further use in the case or plan.

RESULTLIST: to define of list of expected results.

For example in FIG. 3B, step 342 can be written as: SEND <NODEA> "command to send" <ResultListName>. This can be represented in a more readable sentence structure such as: SEND the command "show interface ethernet 2/3" to <NODEA> and verify result <ResultListName>. The grammar enables the following actions to occur based upon the SEND verb. For example, SEND takes the command to send, formats it for the appropriate device and protocol, transmits the command to the node, verifies whether the command has been successful or unsuccessful, gathers any response to the command, processes pre-parsing to remove unsolicited messaging and parses to validate the expected result list as required. The verbs may also have inherent requirements to setup connections and to logon if such an action has not yet been performed. Verbs allow for multiple actions to be performed on behalf of the SME, reducing programming and complexity, and for mapping multiple actions to node class specific requirements.

For example: CONFIGURE "NODEA" <CommandList-Name>. The CONFIGURE command within the command grammar will require for manufacturer #1 that a prerequisite command (for example: "start configuration") be sent to the device to enter configuration mode and a post-requisite series of commands (for example: "store configuration" and "exit configuration") be sent after entering the commands in the command list. When executing for manufacturer #2 no prerequisite or post-requisite commands are required. Abstraction enables the grammar to be applicable to a range of vendor-specific requirements thereby increasing the flexibility of the automation system when dealing with multi-vendor test plans.

It is important to note that the grammar can also be used to verify the negative. SEND "invalid command 1" to NODEA and verify FAIL. In this case the automation system must ensure that the command sent to NODEA is unsuccessful as the expected result is FAIL and if NODEA returns a failed command result then the test case step verdict is a pass.

The command in the test plan 104, in this example "show interface ethernet 2/3", can be an abstraction marker itself. It can be used to lookup the vendor specific CLI command for "show interface ethernet 2/3" in the node database 410 that applies to the node class abstraction marker for NODEA.

Individual nouns and verbs in the command grammar can be named. For example: LIST(listNameOne) "1 2 3 4". ListNameOne is a marker for use in another user-defined command. Other named instances of lists, variables, loops, command lists, result lists, etc. can be created for re-use throughout the test plan.

Another aspect of abstraction markers is that they are often used to replace certain text within a test plan with a reference to another attribute defined within the execution plan. This allows the SME to write a test plan for a specific vendor or hardware class and then use the REPLACE command to abstract its execution. For example the hardware may be abstracted: REPLACE "SONET0/1/0" "Port1". This command replaces all text "SONET0/1/0" with the contents of attributes 312, Port1 defined under the current node, NODEA, in the execution plan 102. The user can accomplish hardware abstraction for line cards, slots, daughter cards, physical ports, and virtual ports using this technique.

When the automation test system is interfacing with a particular device, a unique command line interface (CLI) abstraction is required. For example the test plan verb structure: SEND NODEA "display SONET0/1/0 speed" can be abstracted by using the replace command to map to the actual device commands by: REPLACE "display SONET0/1/0 speed" "show interface SONET0/1/0 bps" as determined from NODEA node class command mapping from the node database.

The same type of abstraction can be used for responses received back from the device and for the command grammar noun definitions such as a RESULTLIST which is used to define expected results that are verified against parsed responses. For example: RESULTLIST(verifyPacket-Counter) "packets input>100" is abstracted by using CLI abstraction to map to the actual device responses by: REPLACE "packets input" "RX packets". In this example manufacturer #2 uses "RX packets" to mean the same as "packets input" used by manufacturer #1 device.

The abstraction of commands in the execution plan 102 and test plan 104 allows for increased test plan flexibility. Test suites can be easily tailored to the users specific requirements and allow for many devices to be tested utilizing a common automation test system and test plan. It should be understood that the examples provided in connection with the structure and formatting of the execution plan 102, test plan 104 and the command grammar and abstraction markers are for illustrative purposes only. A person of ordinary skill in the art would understand that the specific grammar commands may be constructed using any number of common language words and that the structure of the execution and test plans can be structurally different to achieve the same result.

Figure 4:
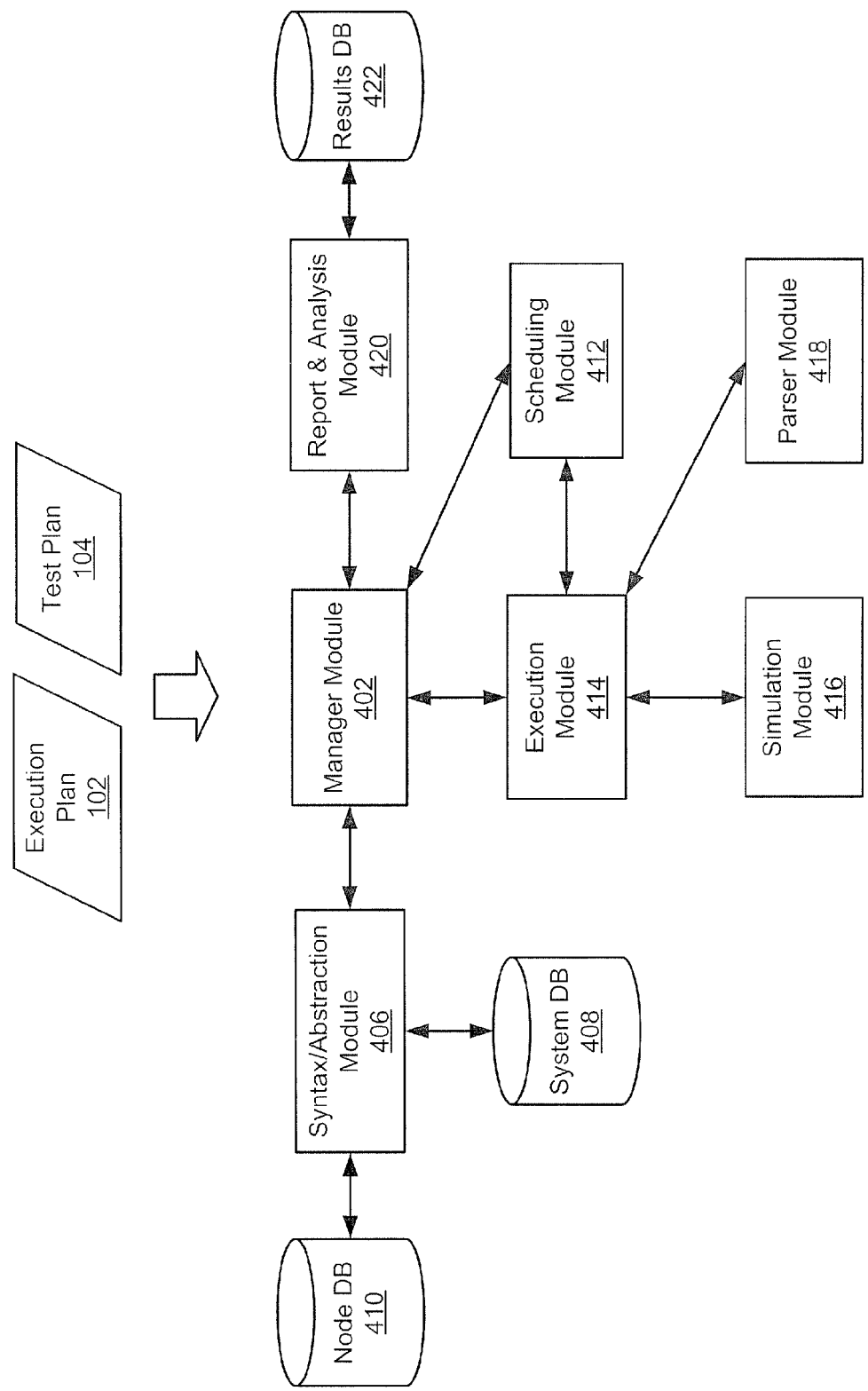
FIG. 4 is a block diagram representing an embodiment of the automated testing environment.

FIG. 4 is a block diagram representing the configuration of an automated testing system which may be executed on server 106. The described modules may be implemented in hardware or software. Additional details of the modules will be described in connection with FIGS. 5 to 11. Functions of the modules may be further segmented into sub-modules or multiple modules may be combined. The manager module 402 coordinates functions of the automated test system and communicates with other modules of the test system. The execution plan 102 and the test plan 104 are provided to the manager module 402 and may be entered directly into the server 106 by input device 210, a storage medium 214 or retrieved from storage device 212. The execution plan 102 and test plan 104 in their electronic form, may be composed as text files, word processing documents or compiled code.

The syntax/abstraction module 406 parses the execution plan 102 and the test plan 104 and verifies the structure and content of the delineation and attribute tags, verifies the structure and use of the verbs and nouns in the defined grammar by processing the defined grammar stored in a system database 408. The syntax/abstraction module 406 also maps the abstraction markers to the hardware, commands and formatting of the specific target devices. For each networked target device identified in the execution plan 102 and test plan 104, the syntax/abstraction module 406 accesses the node database 410 to retrieve node class information such as command and grammar mappings stored in the system database 408 and converts the grammar to the appropriate actions. The system database 408 contains the grammar definitions for the verbs and nouns for conversion to the appropriate actions, structural definitions and tag definitions for both the execution and test plans.

The execution module 414 executes the test plan 104 and execution plan 102 against the target device based upon the device-specific commands abstracted from the syntax/abstraction module 406. The responses or results provided from the test device are parsed by the parser module 418 and are analyzed by the report & analysis module 420 and stored in the results database 422.

A simulation module 416 may be optionally provided to simulate the behavior of hardware not present or available for testing. This allows new automation to be tested prior to actual hardware availability. When a node is simulated, the user can define a simulated response marker, (for example: the test plan and test case ID, and the command to send) as the indicator of which response to return from a simulated response table. This means that new automation test plans can be created without the need to use real hardware and software to "debug" the plans.

The scheduling module 412 provides dynamic scheduling of test plans against target test hardware. Scheduling determines the availability of resources and schedules the execution of the test plan 104 based upon parameters in the execution plan 102 or by scheduling information entered by the automation testing system GUI.

Figure 5:
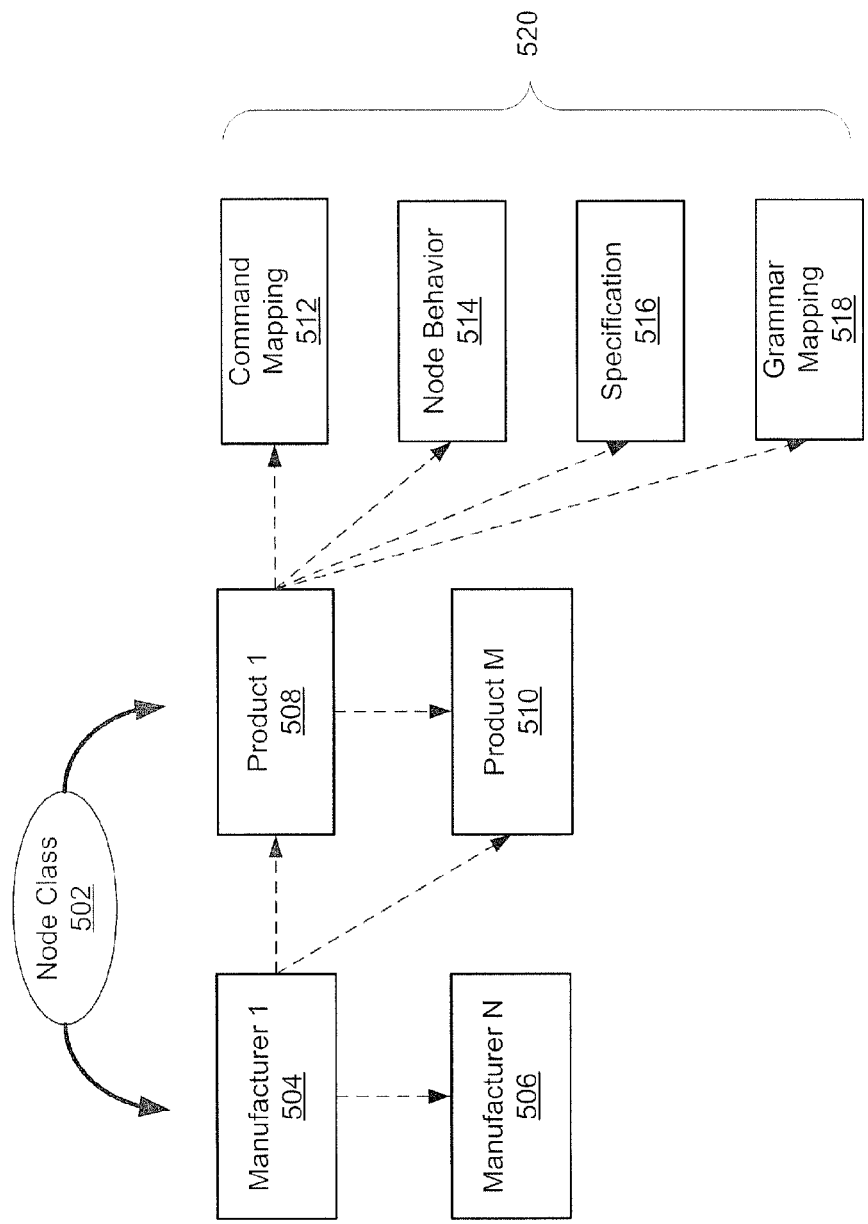
FIG. 5 is a representation of an embodiment of a node database structure.

FIG. 5 is an illustration of a database structure which may be implemented in node database 410. The node database defines device-specific characteristics 520 such as access information as well as the operational and behavioral characteristics of the devices and their components. This information is used by the test system to determine how to connect, login and interact with the devices including what prompts to expect, unsolicited message formats (alarms and errors) and how successful and unsuccessful command responses will be recognized. Also, physical device information to define the connection to the resources to be used for testing includes: device name, IP address, user id, password, device class and type, protocol, etc. may be identified.

It should be understood that the database structure may be implemented by any number of data models to organize the database schema. Commercially available database language such as SQL or other proprietary formats may be used to implement the database. It should also be understood by a person of skill in the art that the database may be structured in a relational model, hierarchical model or a network model to define the relationships between the manufacturer's product commands and the operational and hardware specific aspects of those products.

In the node database 410, multiple hardware manufacturer entries, manufacturer 1 504 to manufacturer N 506, are defined based upon the hardware available in the testbed. Similarly each of the defined manufacturers may have multiple products, product 1 508 to product M 510. The combination of a manufacturer and product defines a node class 502. The products may in turn have multiple operating system versions (not shown) defined against the product which can optionally be used to further refine the definition of a node class. The commands which can be executed against the device are defined by command mapping 512 entries. These entries define the configuration and query commands and the associated formatting requirements for use in CLI abstraction.

A node behavior 514 entry defines how the node is to behave by identifying command line interaction information such as prompts, successful or unsuccessful command responses as well as unsolicited message format (alarms/traps), console prompt(s), login, etc.

A specification 516 entry identifies the performance characteristics of the hardware or individual aspects of the device such as cards or options added to the hardware. For example, card types and associated parameters such as data speeds or processing capability.

A grammar mapping 518 entry maps the abstraction utilized for the vendor specific command grammar implementations. For example, if there are pre-requisite/post-requisite conditions that must be met before/after a CONFIGURE command can be entered or special processing requirements of the CONNECT command.

The node class 502 can be set or an auto-discovery test plan can identify the appropriate node class (such as NODEA 310 as shown in FIG. 3a) by verifying what the device is and setting the appropriate value. In the telecommunications environment examples of possible node classes are: Cisco 12000™, Nortel Passport 7000™, etc. Node classes may also be defined for devices such as traffic generators, networked servers such as Sun Solaris™ or networked services such as MySQL™.

During start-up of the automation test system execution, the appropriate node class 502 definitions are loaded in to the automation test system for the node classes referenced in the combined execution plan 102 and test plan 104.

FIG. 6 is an illustrative example of an execution plan and test plan case structure. The combination of the execution plan 102 and test plan 104, or multiple test plans, as shown by execution plan/test plan 602, defines the hierarchy/order of the test cases 606 of the test plan and how they are to be executed. To accommodate the complexity of modern test environment multiple test cases 606 may be grouped together to form a test group 604. There may be multiple test groups 604 containing multiple test cases 606. Therefore, each test plan may contain one or more test groups each containing one or more test cases. The group/case hierarchy allows for flexibility in how the cases are arranged, described and executed. In addition the configuration allows for a single test group setup to define a configuration that is applicable to many tests under its hierarchy. This saves effort when writing the test plan by not having to redefine each tests configuration, and saves significant time during execution by not having to recreate large configuration scenarios multiple times for each test.

Figure 7:
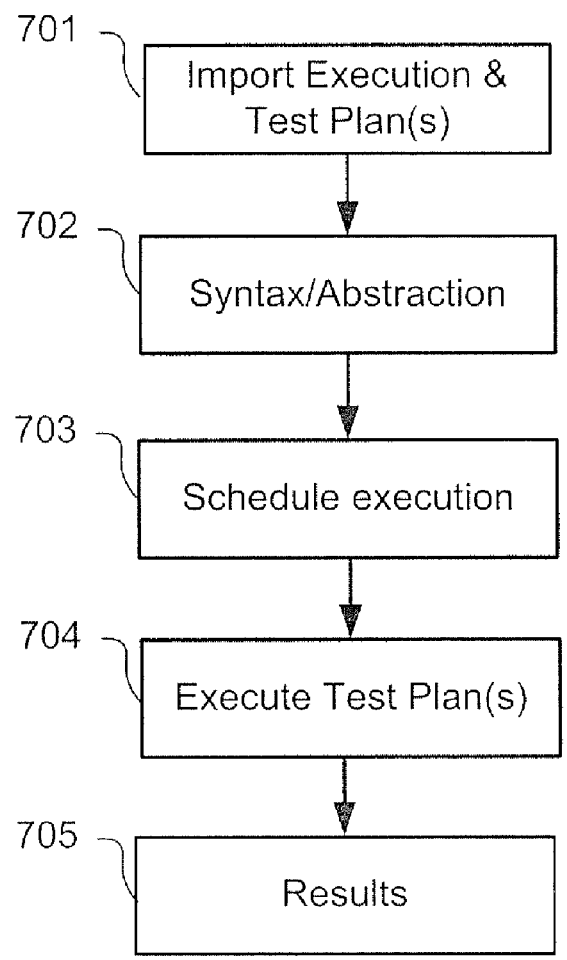
FIG. 7 is a flow diagram showing an embodiment of a manager module.

FIG. 7 is a flow diagram showing an embodiment of a manager module 402. The execution plan 102 and test plan(s) 104 are imported into the automation test system at step 701. The test plan 104, or multiple test plans, associated with the execution plan 102 is/are based upon the testing requirements. The step of importing may grammar verification based upon the definitions stored in the system database 408. Syntax verification of the defined grammar and mapping abstraction markers in the test plan 104 is then performed at step 702 by the syntax/abstraction module 408. At this step the structure of the test plan 104 is verified against the content of the execution plan 102 and the node database 410 to ensure completeness and accuracy of all required definitions. Scheduling at step 703 by the scheduling module 412 of the individual test cases contained in the test plan 104 is then determined against the hardware available on the testbed. The hardware required in the combined execution plan/test plan is checked against the available networked devices of the testbed to determine availability of resources. The grammar of the test cases are converted into actions and objects for the target device as required and are then executed against the target devices by the execution module 414 at the scheduled time at step 704. The results of the test cases are collected, parsed, and analyzed by parser module 420 and available for display at step 705.

Figure 8:
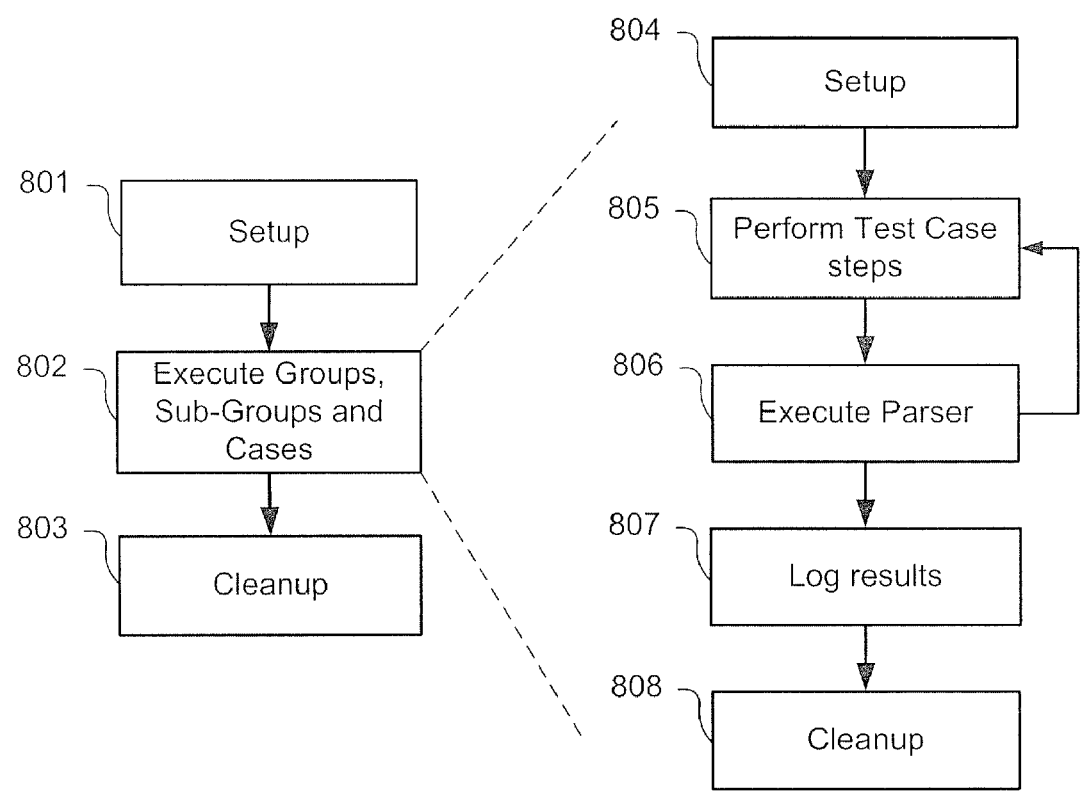
FIG. 8 is a flow diagram showing an embodiment of an execution module.

FIG. 8 is a flow diagram showing an embodiment of an execution module 414. The execution module 414 processes the setup requirements defined in the execution plan in order to prepare the testbed environment for testing at step 801. The setup involves connecting to all devices, verifying and logging hardware/software availability and operational state information. The environment must be configured and operational such that a test scenario can be verified according to the objectives of the test plan. This may involve reloading a specific software version and configuring all of the devices under test as well as the devices that are supporting the test scenario. This may include routers, switches, servers (UNIX nodes), and special function traffic generators.

Traffic generators have the ability to send and receive raw traffic (for example IP or ATM frames); measure traffic rates and timing (in microseconds or nanoseconds) with very high levels of granularity; capture and decode traffic for verifying frame content (in some cases the routers and switches are expected to alter the content of the frames); simulate large networks by providing a selectable size of specialized routing information packets into your system under test thereby creating the appearance of a large scale network. Network configuration may involve injecting error conditions or configuring the network to create various operating conditions required to adequately test the hardware. For example by injecting various amounts of data traffic from the traffic generators, the objective may be to prove that a certain quality of service on the network can be met under overloaded network conditions.

At the high level, the top test group or test case is then executed. As described in connection with FIG. 6, the hierarchical structure of the test group and test case is implemented at step 802. Each test group or test case may then have unique setup requirements as shown at step 804. By referencing the node class the following setup steps can occur:

1) Load the appropriate slot, backplane, card type and related specifications
2) Create the proper abstracted grammar
3) Load parsers
4) Define successful, unsuccessful and unsolicited message formats
5) Load default command response sub-parsers which may be selected from multiple parsers for example raw text parser or attribute=value parsers
6) Load specific node parsers
7) Implement the proper abstraction markers
8) Load specific node prompts
9) Load node specific protocol and access information
10) Connect to all required devices The steps defined in the test case are then executed at step 805. After each step the result, in the form of a message or response, is received and is then parsed at step 806. The next step in the test case is then performed at step 805 repeating the parsing step 806 until the test case is complete. The results are then logged at step 807. Cleanup of the hardware such as removing traffic from the network or resetting the network configuration is then performed at step 808. Each test or group can be designed to return the state and configuration to its original condition prior to its own modifications to setup, if this fails, the test will be flagged as discussed in connection with FIG. 11. The nested steps 804 to 808 are repeatedly performed until all desired groups and test cases are completed. The entire execution environment is then cleaned up at step 803, returning the testbed to its pre-execution state.

Figure 9:
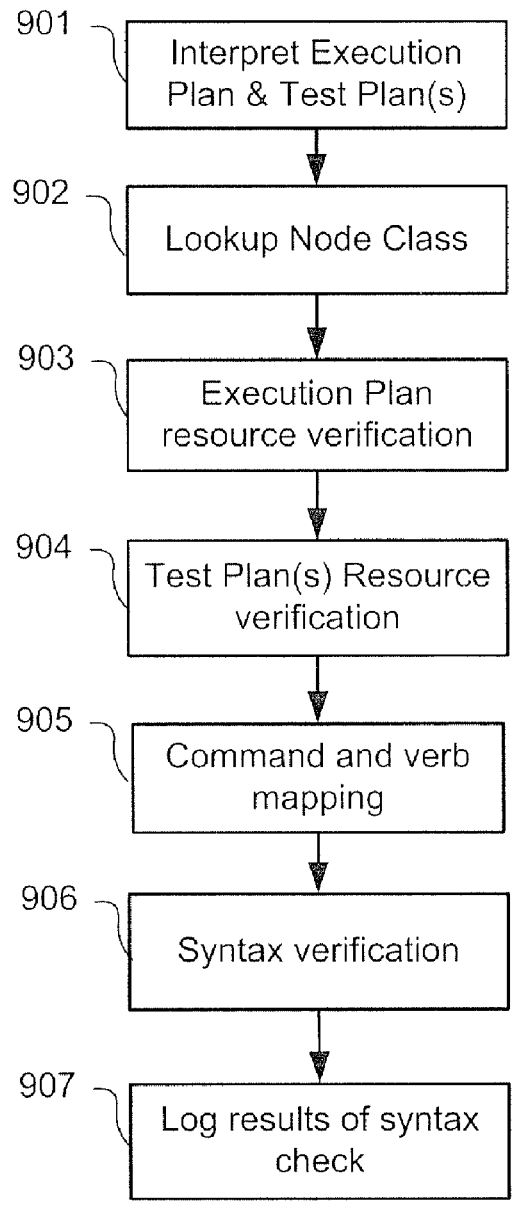
FIG. 9 is a flow diagram showing an embodiment of a syntax/abstraction module.

FIG. 9 is a flow diagram showing an embodiment of a syntax/abstraction module 406. The execution plan 102 and test plan(s) 104 are interpreted at step 901 to determine which node class definitions are required from the database 410 at step 902 and the appropriate grammar conversion from the system database 408. The device or node class definitions will be dependent on the device under test. The resources identified in the execution plan 102 must be verified for availability at step 903. Verification entails determining if the resources are operational and available for testing. The resources required in the test plan 104, for the particular test cases to be executed, are verified at step 904. At step 905, the test cases of the test plan 104 are then parsed and the grammar and abstraction markers are replaced with the appropriate commands specific to the target device. The syntax of the compiled plan is verified at step 906 to ensure that the plan will execute properly. The results of the syntax check and abstraction of the test plan are logged to the database and presented at step 907.

Figure 10:
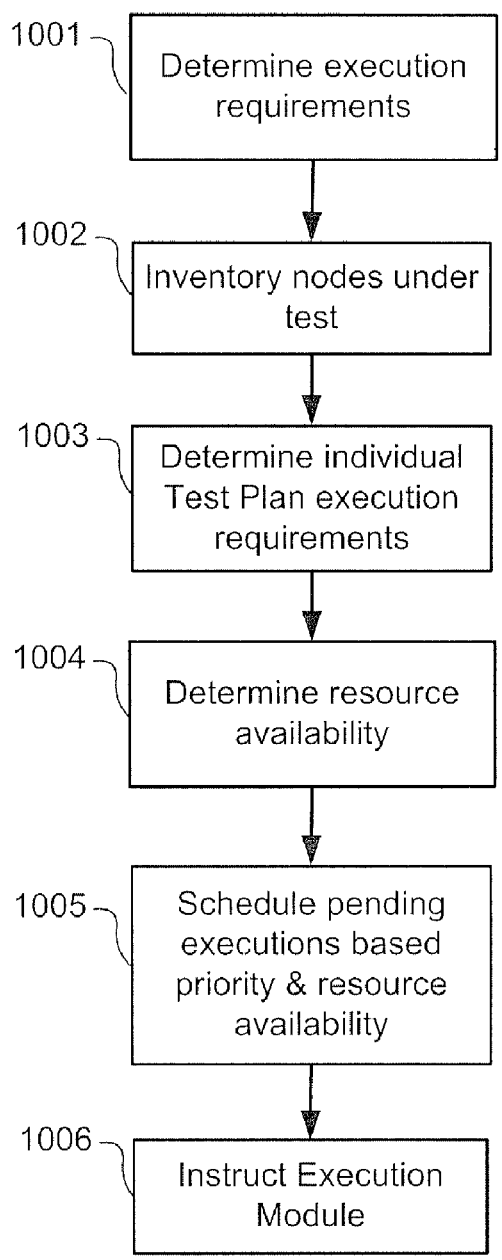
FIG. 10 is a flow diagram showing an embodiment of a scheduling module.

FIG. 10 is a flow diagram showing an embodiment of a scheduling module 412. The execution plan 102 defines the testbed hardware requirements such as the type of networked device that is requested for the specific test and is determined at step 1001. The testbed is inventoried to determine if the required hardware is available at step 1002. The execution requirements of the individual test cases are then assessed at step 1003. The resource availability is then determined at step 1004 and may be performed by querying hardware and/or verifying current and planned usage. Resources that are unavailable are not included in subsequent steps. The required resources may be present but other test cases may already be scheduled or in the process of execution against the target hardware or sufficient processing resources may not be available.

At step 1005 the test cases are then scheduled for execution. A priority for each execution may be assigned or be determined by the network configuration and resource organization. The priority of the test execution and the resource requirements can then be used to determine the optimal execution plans and schedule the testing accordingly. The execution module 414 is then instructed to execute the desired test plans at the scheduled times at step 1006. The schedule may also operate in a continuous dynamic mode by monitoring the condition of devices in the test network to determine issues which may impact scheduling of future test plans. If the network status changes the scheduler can determine which test plans can be executed most effectively with the given resources and schedule the execution accordingly.

Figure 11:
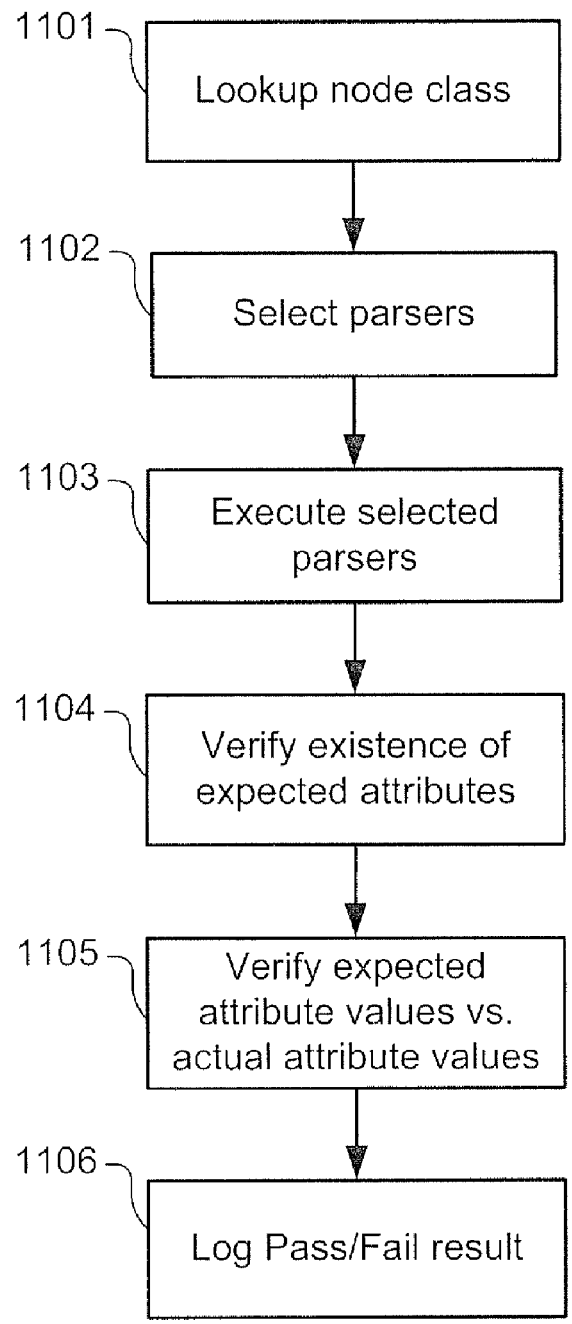
FIG. 11 is a flow diagram showing an embodiment of a parser module.

FIG. 11 is a flow diagram showing an embodiment of a parser module 420. The parser module 420 parses the device output to determine if the command sent, successful or not, is as expected by comparing the returned response or result to an expected response or result. The parsed logs are stored in the results database 422. The parser module is segmented into sub-parsers. Each sub-parser performs a specific function against the device output such as, for example, identifying absolute text output by interpreting markers or identifiers in the response from the device or identifying alarms and error conditions specific to the device. Common parser modules may be commonly used across multiple device types. Alternatively unique parsing modules may be created to deal with unique device output features of a device that identify unique parsing characteristics. For example, a tabular output format or an alarm format may be unique to the manufacturer and have unique parsers.

At step 1101 the node class is retrieved from the node database 410 to determine which parsers are applicable. The identified parsers are then selected at step 1102. The parsers are executed against the collected log data at step 1103. The execution of the parser may occur in a post-processing method or in real-time as the test responses are retrieved. The parsers verify the existence of expected or unexpected attributes in the received log at step 1104 based upon command responses which are either solicited, for example configuration confirmation response or status query, or unsolicited, for example alarms or status notifications. At step 1105 the expected attribute values versus the actual attribute values are compared. For example, when verifying that a network path is operational and ready for data transport a test case may require 100% positive responses to the IP ping command and that each interface in the path has a packet counter value equal to the number of ping packets sent and received. Based upon the value, a verdict such as Pass, Fail, Parent Fail, Child Fail, Not Applicable, Incomplete, Abort, Unclean, etc. will be assigned to the test step. A Parent Fail verdict will be assigned if a group setup fails and therefore all of the children test groups and cases will not run. A Child Fail verdict will be assigned to a parent group when a test case in a group or sub-group fails. A test group or case that is unable to successfully complete a cleanup will be assigned a verdict of Unclean. It should be noted that all verdicts of tests that follow an Unclean verdict may be considered suspect. An Incomplete verdict is assigned when a test case was commenced and failed to successfully complete setup and therefore did not execute the test steps. Parsing happens during execution of each command/response and is also applicable for unsolicited responses such as alarms.

During execution all log files are indexed in real-time. Each individual line that is written to any log has a relative position pointer (RPP) that acts as a relative chronological index. A source position pointer (SPP) is maintained for each RPP. The SPP links to the test steps defined in the test plan and the execution plan. This unique linkage method for all source and log files provides a dramatic improvement to the log review and problem determination process especially when reviewing large complex test cases and result logs.

The test group and case results can then be used to create execution summarized reporting. The summarized reporting can provide summarized Pass/Fail results of test case executions by: each test case, for a total by all cases within a plan, by a project name, by a software version, by a particular user, by a particular testbed, by day, week, month, or by any combination of the above as well as several other filterable (selectable) fields including user-defined fields.

The embodiments of the invention described above are intended to be illustrative only. The scope of the invention is therefore intended to be limited solely by the scope of the appended claims.

The invention claimed is:

1. An automation test system, for testing and control of a plurality of networked devices, the system comprising:
   a node database comprising device-specific characteristics associated with each of the plurality of networked devices;
   an abstraction module for converting verbs identified in a plurality of test cases to a set of actions, selected based on device-specific characteristics mapped from the node database, to be executed in relation to target networked devices, the abstraction module also for mapping abstraction markers used in the test cases to device-specific characteristics, wherein the verbs and abstraction markers form device-specific commands;
   an execution module for executing the device-specific commands generated by the abstraction module, against the target networked devices, by sending device-specific commands to the target networked devices; and
   a parser module for parsing responses received from the target networked devices during execution of the test cases by the execution module, and for determining a verdict for each test step and for each test case.

2. The system of claim 1 wherein the abstraction markers further comprise hardware abstraction markers and command line interface (CLI) abstraction markers.

3. The system of claim 1 further comprising a system database comprising a command grammar defining the verbs and associated actions to be executed.

4. The system of claim 3 wherein the execution module utilizes at least one execution plan which defines configuration requirements and execution requirements, wherein the execution plan relates the test case resources to the target networked devices in the node database.

5. The system of claim 4 wherein test cases are arranged hierarchically into groups in a test plan comprising tags delineating groups from cases and procedural sections therein, the verdict of each procedural section can alter execution of the remaining procedural sections of the test cases and test groups.

6. The system of claim 5 wherein the abstraction module further comprises a syntax module which verifies test plan and execution plan structure and hierarchy, and the node database referenced hardware and CLI abstraction.

7. The system of claim 6 further comprising a scheduler module for scheduling executions of the test plans against the networked devices, wherein the scheduler dynamically assesses availability of the networked devices and determines the optimal time for execution based on requirements such as those defined in the execution plan.

8. The system of claim 6 further comprising a system database containing grammar definition, test plan and execution structure and supported tags utilized by the abstraction module to interpret the test and execution plan validity.

9. The system of claim 4 wherein the execution requirements identified in the execution plan define control flags to be used within the test cases.

10. The system of claim 1 wherein the node database further comprises node classes, each node class associated with a unique group of networked devices having common characteristics.

11. The system of claim 10 wherein the characteristics are selected from the group comprising: connection parameters, login and response formats including prompts, unsolicited message formats and recognition of successful and unsuccessful commands.

12. The system of claim 11 wherein the parser module utilizes expected responses defined in the test cases and device-specific characteristics from the node database to determine the verdict of test steps.

13. The system of claim 12 wherein the verdict of execution of the test case is selected from the group comprising: Pass, Fail, Parent Fail, Child Fail, Not Applicable, Incomplete, Unclean, Error and Abort.

14. The system of claim 1 further comprising a simulation module for simulating behaviour and response of one or more networked devices.

15. The system of claim 1 further comprising:
   a results database for storing all execution log files, including responses received from the networked devices; and
   a report and analysis module for indexing each line of each execution log file with a relative position pointer (RPP) and a source position pointer (SPP), wherein the RPP is a relative chronological index established during execution and the SPP links to the source test steps defined in the test cases.

16. A computer readable medium, containing one or more instructions executable by a computer for performing a method of test and control of a plurality of networked devices, the method comprising:
   converting verbs identified in test cases to a set of actions to be executed in relation to the plurality of networked devices;
   mapping abstraction markers in test cases to device-specific characteristics of the plurality of networked devices;
   sending device-specific commands comprising the converted actions and mapped characteristics to the plurality of networked devices;
   receiving responses from the plurality of networked devices;

parsing the received response for each of the plurality of networked devices to determine a result for each test step and for each test case; and storing the result.

17. A method of testing and control of a plurality of networked devices, the method comprising:

converting verbs identified in test cases to a set of actions to be executed in relation to the plurality of networked devices;

mapping abstraction markers in test cases to device-specific characteristics of the plurality of networked devices;

sending device-specific commands comprising the converted actions and mapped characteristics to the plurality of networked devices;

receiving responses from the plurality of networked devices;

passing the received response for each of the plurality of networked devices to determine a result for each test step and for each test case; and storing the result.

18. The method of claim 17 wherein converting and mapping further comprises retrieving device-specific actions and characteristics from a database for each of the plurality of networked devices.

19. The method of claim 18, wherein prior to sending, further comprises:

verifying test case structure and grammar against rules defined in a system database;

verifying validity of verbs against grammar mappings in the node database;

verifying validity of abstraction markers against command mappings and node specifications in a node database; and verifying resulting device-specific commands against node behaviours in the node database.

20. The method of claim 17 wherein parsing further comprises utilizing expected responses defined in the test case and device-specific characteristics retrieved from the database.

21. The method of claim 20 wherein the characteristics are selected from the group comprising: connection parameters, login and response formats including prompts, unsolicited message formats and recognition of successful and unsuccessful commands.

22. The method of claim 17 wherein the abstraction markers used in mapping further comprise hardware abstraction markers and command line interface (CLI) abstraction markers.

23. The method of claim 17 further comprising scheduling the execution of one or more test cases based upon associated configuration and execution requirements and availability of each of the plurality of networked devices.

24. The method of claim 17 wherein storing further comprises associating each line of each execution log file with a relative position pointer (RPP) and a source position pointer (SPP), wherein the RPP is a relative chronological index established during execution and the SPP links to the source test steps defined in the test cases.

25. The method of claim 17 wherein the result is a verdict selected from the group comprising: Pass, Fail, Parent Fail, Child Fail, Not Applicable, Incomplete, Unclean, Error and Abort.

26. The method of claim 17 wherein parsing further comprises:

parsing the received responses for each of the plurality of networked devices using a subset of a plurality of sub-parsers to determine a result for each test step and for each test case, each sub-parser performs a specific parsing function on the received responses, wherein the subset from the plurality of sub-parsers are selected based upon device-specific characteristics identified in the node database for each targeted networked device; and determining a verdict for each test step and for each test case by parsing the received responses.

27. The system of claim 1 wherein the parser module further comprises a plurality of sub-parsers for parsing responses received from the target networked devices during execution of the test cases by the execution module, each sub-parser performs a specific parsing function on the received responses, wherein a subset of the plurality of sub-parsers are selected based upon device-specific characteristics identified in the node database for each targeted networked device such that the parser module determines and assigns a verdict for each test step and for each test case by parsing the received responses.

28. The computer readable medium of claim 16 wherein parsing further comprises:

parsing the received responses for each of the plurality of networked devices using a subset of a plurality of sub-parsers to determine a result for each test step and for each test case, each sub-parser performs a specific parsing function on the received responses, wherein the subset from the plurality of sub-parsers are selected based upon device-specific characteristics identified in the node database for each targeted networked device; and determining a verdict for each test step and for each test case by parsing the received responses.

* * * * *